United States Patent
Border et al.

(10) Patent No.: US 8,605,185 B2
(45) Date of Patent: *Dec. 10, 2013

(54) CAPTURE OF VIDEO WITH MOTION-SPEED DETERMINATION AND VARIABLE CAPTURE RATE

(75) Inventors: John N. Border, Walworth, NY (US); Michael E. Miller, Honeoye Falls, NY (US); Christopher J. White, Avon, NY (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/292,143

(22) Filed: Nov. 9, 2011

(65) Prior Publication Data

US 2012/0057029 A1 Mar. 8, 2012

Related U.S. Application Data

(63) Continuation of application No. 12/401,633, filed on Mar. 11, 2009, now Pat. No. 8,179,466.

(51) Int. Cl.
*H04N 5/335* (2011.01)
*H04N 3/14* (2006.01)

(52) U.S. Cl.
USPC ........................................ 348/308; 348/222.1

(58) Field of Classification Search
USPC ................. 348/294–324, 231.3, 231.6, 220.1
See application file for complete search history.

(56) References Cited

U.S. PATENT DOCUMENTS

| | | | |
|---|---|---|---|
| 4,535,355 A | 8/1985 | Arn et al. | |
| 5,389,965 A | 2/1995 | Kuzma | |
| 5,969,764 A | 10/1999 | Sun et al. | |
| 6,044,182 A | 3/2000 | Daly et al. | |
| 6,253,161 B1 | 6/2001 | Arias-Estrada | |
| 6,931,065 B2 | 8/2005 | Kim | |
| 7,194,126 B2 | 3/2007 | Konolige | |
| 7,242,850 B2 | 7/2007 | Cok | |
| 7,385,626 B2 | 6/2008 | Aggarwal et al. | |
| 7,403,640 B2 | 7/2008 | Zhang | |
| 8,139,121 B2 | 3/2012 | Ito | |
| 8,179,466 B2 * | 5/2012 | Border et al. ................ | 348/308 |
| 2003/0235327 A1 | 12/2003 | Srinivasa | |
| 2005/0018854 A1 | 1/2005 | Yamamoto et al. | |
| 2006/0088161 A1 | 4/2006 | Hashimoto et al. | |
| 2006/0146161 A1 | 7/2006 | Farrier | |
| 2006/0165386 A1 | 7/2006 | Garoutte | |
| 2007/0024931 A1 | 2/2007 | Compton et al. | |
| 2007/0041443 A1 | 2/2007 | Ha et al. | |
| 2007/0132852 A1 | 6/2007 | Yu | |
| 2007/0171298 A1 | 7/2007 | Kurane | |
| 2007/0195182 A1 * | 8/2007 | Ito ................................ | 348/308 |
| 2008/0084486 A1 | 4/2008 | Enge et al. | |
| 2009/0021612 A1 | 1/2009 | Hamilton, Jr. et al. | |
| 2009/0066782 A1 | 3/2009 | Choi et al. | |

* cited by examiner

*Primary Examiner* — Nelson D. Hernández Hernández
(74) *Attorney, Agent, or Firm* — Wong, Cabello, Lutsch, Rutherford & Brucculeri, LLP

(57) ABSTRACT

A method of capturing a video of a scene depending on the speed of motion in the scene, includes capturing a video of the scene; determining the relative speed of motion within a first region of the video of the scene with respect to the speed of motion within a second region of the video of the scene; and causing a capture rate of the first region of the video of the scene to be greater than a capture rate of the second region of the video of the scene, or causing an exposure time of the first region to be less than exposure time of the second region.

20 Claims, 6 Drawing Sheets

CAPTURE OF VIDEO WITH MOTION-SPEED DETERMINATION AND VARIABLE CAPTURE RATE

CROSS-REFERENCE TO RELATED APPLICATIONS

This application is a continuation of prior U.S. patent application Ser. No. 12/401,633, filed Mar. 11, 2009, now U.S. Pat. No. 8,179,466 which is hereby incorporated herein by reference in its entirety.

Reference is made to U.S. patent application Ser. No. 12/262,227 filed Oct. 31, 2008, (published as U.S. 2010/0110209), entitled "Fast Motion Measurement Device for Gaming" by Border et al., the disclosure of which is incorporated herein.

FIELD OF THE INVENTION

The invention pertains to the capture of multiple digital images of a scene where motion is present in the scene. More specifically, the invention pertains to an improved method for capture of a video of a scene where rapid motion is present in the scene.

BACKGROUND OF THE INVENTION

Digital capture of videos of scenes is a useful and commonly-practiced technique. Videos are typically captured as a series of individual frames at a selected frame rate, e.g. 24 frames per second (fps), and each frame is captured by accumulating light for a selected exposure time within the available frame time, e.g. 41.7 millisec (=1/24 sec.). Each frame is a two-dimensional array of individual pixels.

Scenes, and thus videos of scenes, can contain global motion or local motion. Global motion refers to relative motion between the image capture device and the scene being imaged, such as when a camera is panning across a scene. Local motion refers to motion of objects within the scene, such as a ball being thrown. When a video contains either global or local motion, and the motion that occurs during the exposure time of a frame causes the light from an object to spread across more than one pixel, image quality can be degraded in the form of blurring and smearing of the image. For example, a five megapixel (5 Mp) camera which has a lens with a 50 degree field of view operating at 30 fps (33 ms exposure time) produces blur of more than two pixels when capturing video of an object located 15 feet from the camera that is moving faster than 4 inches/sec (the equivalent of a very slow wave). It is therefore desirable to reduce blur of rapidly moving objects in video frames to improve video image quality.

Typically higher quality video such as high definition (HD) video (720p, 1080i or 1080p) is captured at a higher frame rate, e.g. 30 fps or 60 fps, to reduce the blurring associated with motion during capture. However, when rapid motion is present in the scene, such as a ball being thrown in a sporting event, the image of the ball can be noticeably blurred even when captured at 60 fps. Very fast frame rates can be used to reduce blur and improve video image quality of rapidly moving objects. However, as the frame rate is increased, the amount of image data associated with the video increases proportionately, which can result in data rates too high for data storage, image processing or data transmission bandwidth in imaging systems such as a consumer video camera, a digital camera or a cell phone camera. As a result, consumer imaging devices are typically limited to frame rates of 30 fps or 60 fps at 720p or 1080p resolutions.

Video compression techniques can reduce data transmission bandwidth and data storage requirements by detecting changes such as mean absolute differences between frames and avoiding the transmission of duplicate image data for multiple frames when the scene is not changing. U.S. Pat. Nos. 6,931,065 and 5,969,764 ('764) include motion estimation in their respective compression techniques. As such, the technique described in the '764 patent reduces the data transmission rate for regions of the scene that are not changing but keeps the original capture data transmission rate for areas where motion is present. However, this method does not reduce data rate or blur in the video frames as captured.

Motion detection between images, such as between the frames in a video, is described in U.S. Pat. Nos. 7,403,640 ('640), 7,385,626 and 6,931,065. The '640 patent is further described in Zhang, B. (2003), "Regression Clustering," IEEE ICDM '03 Proceedings, 0-7695-1978-4/03. These techniques assess the speed of motion that is present within the scene and identify regions in the video frames where rapid motion is present such as a person running or a ball being thrown. The motion assessment can result in a motion map or a series of motion vectors for individual pixels or groups (or regions) of pixels within the images with speed data or speed and direction data. This motion assessment information can be used to reduce the data transmission rate by reusing image content for an object even as it moves. However, these schemes have no effect on blur in the captured video.

U.S. Pat. No. 5,389,965 describes a variable frame rate system for video communication. This system permits the user to select the frame rate used to deliver the desired image quality in a mobile communication environment where data transmission bit rates are limited. Slow frame rates are thus used to deliver higher resolution images at the expense of jerky motion. Faster frame rates deliver smoother motion with lower resolution images. This approach does not address the need for improved capture of rapidly moving objects.

In addition, increasing the frame rate can reduce the exposure time for each frame to the point that noise becomes a problem in the frames in low light situations. As the frame rate is increased, the available exposure time for each frame is correspondingly decreased and the noise present in each frame increases. Although the noise is not as noticeable to a viewer in portions of frames which contain motion, due to frequency masking in the human visual system, noise can be very noticeable in portions of frames which contain no motion or slow motion. As a result, it is desirable to avoid high noise levels in regions of the frame in which slow motion or no motion is present.

Consequently, there exists a need for a faster frame rate capture of video for rapid motion in a way that does not substantially increase the amount of image data associated with the video or significantly increase the noise level in static regions of the image.

SUMMARY OF THE INVENTION

This need is met by a method of capturing a video of a scene depending on the speed of motion in the scene, comprising:
  (a) capturing a video of the scene;
  (b) determining the relative speed of motion in a first region of the video of the scene with respect to the speed of motion in a second region of the video of the scene; and
  (c) causing a capture rate of the first region of the video of the scene to be greater than a capture rate of the second region of the video of the scene, or causing an exposure time of the first region to be less than an exposure time of the second region.

An advantage of this invention is that motion blur in a video is reduced without increasing the bandwidth required by the video.

DETAILED DESCRIPTION OF THE INVENTION

Figure 6:
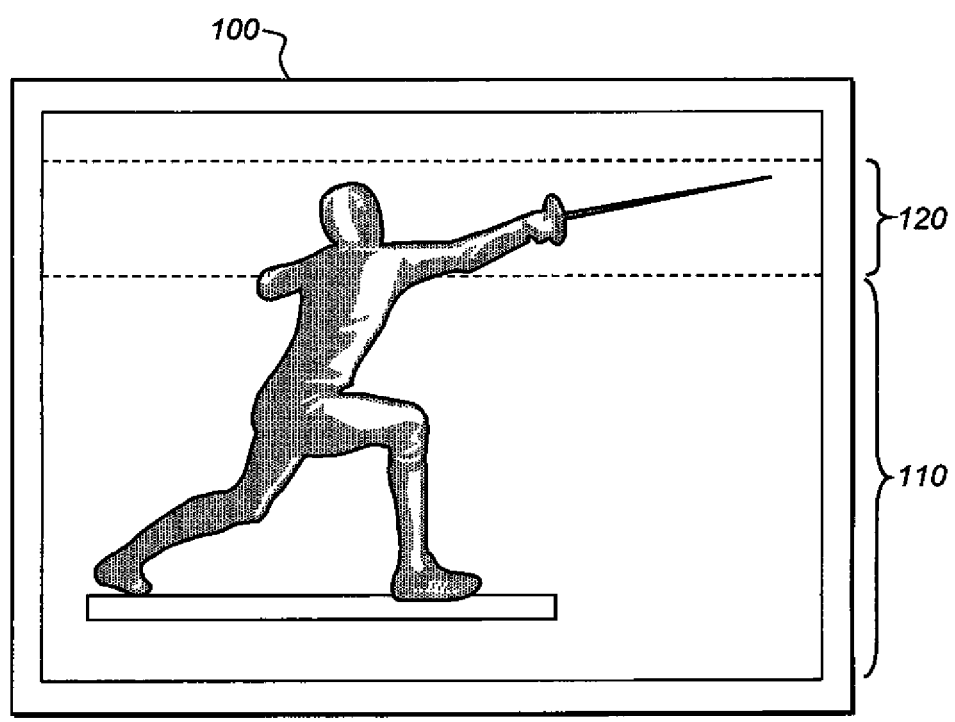
FIG. 6 shows an illustration of a video image captured using the method of an embodiment of the invention.

FIG. 6 shows an illustration of a video frame 100 of a person fencing that has rapid motion in the region of the image 120 that contains the person's arm and the fencing foil, and slower motion in the region of the image 110 that contains the person's lower body. In an embodiment of the present invention, the local capture rate is increased in the regions (120) of the video frames 100 when the speed of motion relative to the exposure time in the region is above a motion blur threshold. For example, if the motion would cause motion blur larger than two or four pixels in each video frame 100 if captured at a base frame rate such as 30 fps, the local capture rate is increased. Within the limitations of the image capture device (digital camera, video camera, cell phone camera, or other), the capture rate for the region 120 with rapid motion is preferably increased to reduce the motion blur in the region to four pixels or fewer, and more preferably two pixels or fewer. FIG. 6 shows the region 120 where the capture rate is increased as a single rectangular shape, but there can be more than one region 120 within a frame 100 with increased capture rate, and the region(s) 120 with increased capture rate can be in the form of rows, columns, circles, blocks or arbitrary shaped groups of pixels.

The motion blur threshold is chosen relative to the size of the repeat pattern of the pixels on the image sensor. For an image sensor with a Bayer pattern of red, green and blue pixels, motion of a colored object can be detected within two pixels due to the size of the well known 2×2 repeating Bayer pattern. Consequently, a two pixel motion blur threshold can be used with a Bayer sensor. For other pixel patterns, including those with red, green, blue and panchromatic pixels such as those described in commonly-assigned U.S. Patent Application Publication No. 2007/0024931, the repeat pattern of the pixels can be 4×4 or larger and as a result the motion of colored objects that can be detected can be four pixels or larger. As a result, for image sensors of these types, a four pixel motion blur threshold can be used. For image sensors that include panchromatic pixels, motion can also be detected using only the panchromatic pixels. The motion blur threshold can be therefore chosen based on the repeat pattern of the panchromatic pixels alone, which can be two pixels or less.

Multiple different capture rates (or frame rates) of regions or groups of pixels on an image sensor can be supported simultaneously on some types of image sensors such as CMOS image sensors. Commonly-assigned U.S. Patent Application Publication No. 2008/0084486 describes a method of using an image sensor in an image capture device to provide at least two different video signals at different capture rates, wherein the video signal with a faster capture rate is used to adjust the capture parameters of the image capture device such as autoexposure or autofocus. The invention described herein uses the capability of an image sensor (CMOS or CCD) supporting multiple different capture rates simultaneously to enable faster capture rates to be used for portions of the image sensor that correspond to regions in the scene with rapid motion so that the motion blur can be reduced.

Figure 5:
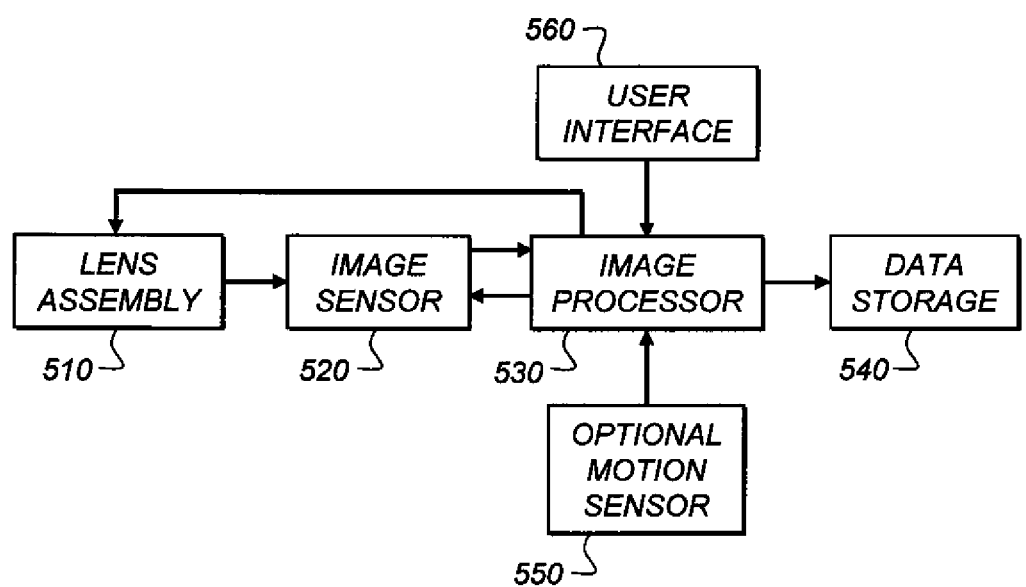
FIG. 5 shows a block diagram of an image capture device as used in the invention.

FIG. 5 shows a block diagram of an image capture device that is useful in the present invention. A lens assembly 510 gathers light from the scene and provides it to an image sensor 520. The image sensor 520 includes an array of pixels, which converts the light applied to the pixels to image data (or video frames). This image data is provided to an image processor 530. The image processor 530 analyzes the image data, optionally in combination with inputs from the user through a user interface 560, to determine the capture parameters and the capture rate. The image processor 530 uses the capture parameters and capture rate to control the settings of the lens assembly 510 and the operation of the image sensor 520. The lens assembly 510 settings include: the f#, the zoom setting and the shutter timing. The operation of the image sensor 520 includes the reset and readout timing and the resolution of the sensor or binning of the pixels. The image processor 530 then organizes and processes the image data before sending it to the data storage 540. In addition, FIG. 5 shows an optional dedicated motion sensor 550, which gathers motion information of the scene at a faster capture rate and provides it to the image processor 530.

Figure 1:
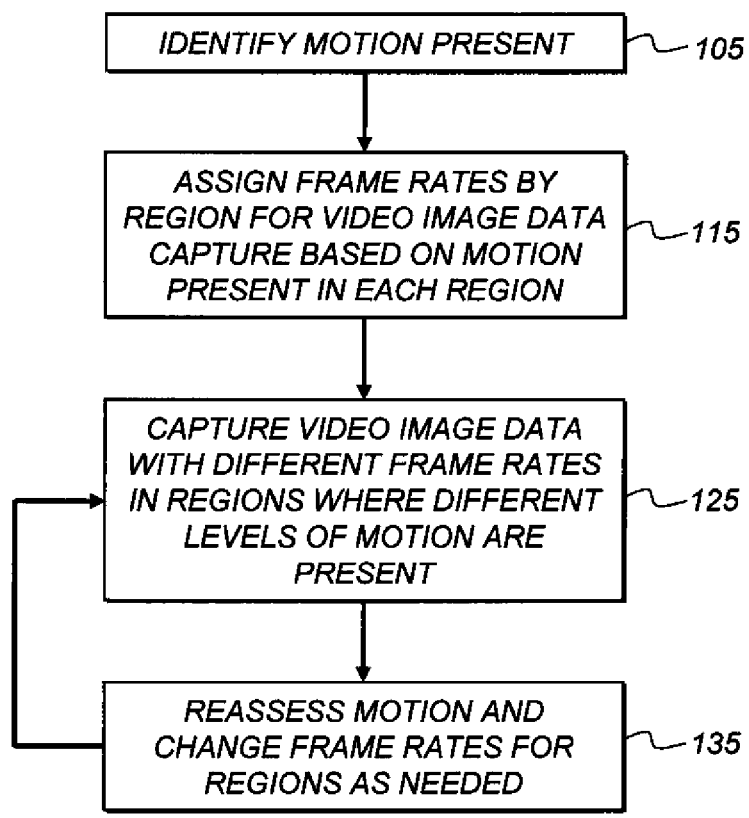
FIG. 1 shows a flow diagram for the video image capture method according to one embodiment of the invention.

FIG. 1 shows a flow diagram of a method for capturing video frames of a scene according to one embodiment of the invention. The user initiates the capture sequence by pushing a capture button. In Step 105, the relative speed of motion of first regions within the scene with respect to second regions within the scene is determined by capturing and comparing two or more motion identification images, based on the changes in locations of objects within consecutive motion identification images and the time elapsed between the captures of the motion identification images. The relative speed of motion is compared to the exposure time for the video frame to determine the number of pixels of motion blur that would be caused by the motion if the video frame were to be captured at the base capture rate. In the system, the exposure time is typically determined by an autoexposure system in the image capture device to produce an image with an acceptable signal to noise ratio. In Step 115, capture rates for different regions within the video frames are assigned based on the determined relative speed of motion in the scene and the corresponding regions of the video frames. Regions in the video frames with slow or no motion, are assigned a relatively slower capture rate or maintained at the base capture rate, whereas, regions with rapid motion are assigned a relatively faster capture rate. Capture rate refers to the frequency that images of the region are captured within a period of time. In the event that no rapid motion is present in the scene such that the blur in the video frames is less than the motion blur threshold, the capture rate for the entire video image is assigned as the base capture rate or base frame rate. In Step 125, images for the different regions of the video image are captured with the capture rates as assigned in Step 115 and stored or transmitted. As such, the image capture device causes the capture rate of a first region to be greater than the capture rate of a second region when the speed of motion within the first region, relative to the speed of motion within the second region, is above a predetermined relative speed or motion blur threshold. The capture rate of the first region is selected to reduce the motion blur in each video frame. It is preferable that the capture rate for the first region be increased whenever the relative speed in the first region with respect to the second region causes greater than 2 or 4 pixels of motion blur per video frame in the first region if it were to be captured using the capture rate of the second region or the base capture rate. In Step 135, the motion is reassessed and the assigned capture rates for different regions are changed as needed. The process then goes back to Step 125 for capture of additional video images.

Figure 2:
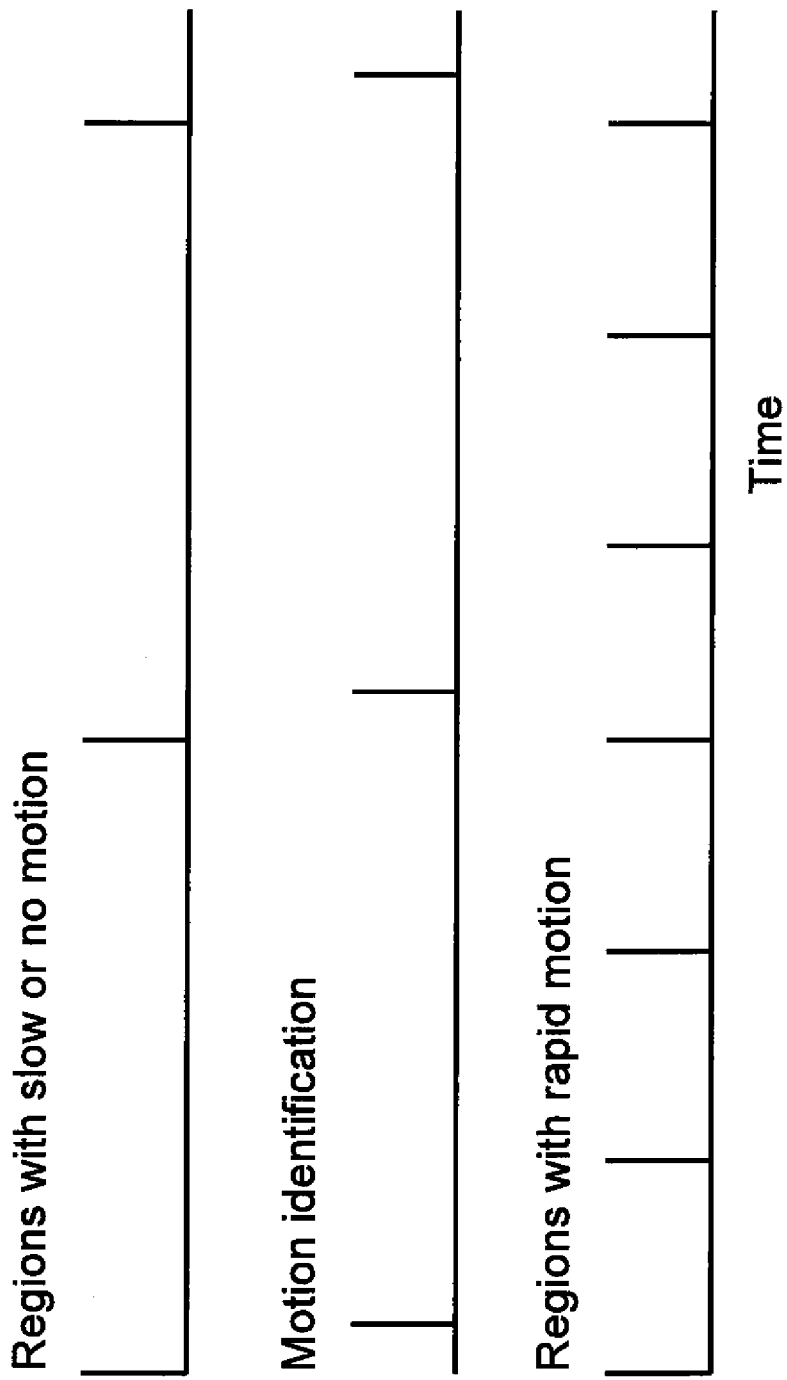
FIG. 2 shows a schematic diagram of the relative timing of the captures of the different types of images that are included in an embodiment of the invention.

FIG. 2 shows a schematic diagram of an example of the relative timing of the continuous captures of the different types of images that are included in one embodiment of the invention. In this embodiment, motion identification is done by comparing the last two consecutive images captured either from the preview stream or from the video frames themselves. Since the motion identification is done on the last two consecutive images, the motion identification data is available some time following the capture of the last two consecutive images as shown in FIG. 2. As shown for the example in FIG. 2 by the relative timing of the video frame captures, the regions with rapid motion have three images captured after the motion has been identified, while in the same amount of time, only one image of the regions with slow motion or no motion is captured. As a result, the blur in the regions with rapid motion is reduced to ⅓ what it would have been if the regions with rapid motion were captured at the base capture rate or the same capture rate as the regions with slow motion or no motion. It is also within the scope of the invention for the motion identification images to alternately (or in addition) come from the images of the different regions being captured at their respective capture rates to improve the tracking of rapidly moving objects in the scene.

The invention further includes an embodiment in which exposure time is reduced, to less than the time between captures, for the first regions of the video frames that correspond to regions of rapid motion in the scene to reduce motion blur in each video frame. This reduction in exposure time for the first regions of the video frames can be combined with an increased capture rate as well to further reduce motion blur in each video frame. It should be noted that as the exposure time is reduced, noise becomes more noticeable in the images so that methods to reduce noise should be considered for the images of the regions which are captured with reduced exposure time. Of course, as capture rate is increased, the available time between captures is reduced and as a result the exposure time is reduced as well.

In yet another embodiment, the invention includes a method for capturing videos of scenes with less rapid motion in the scenes, wherein the exposure time for the first regions of the video frames of the scene with the less rapid motion is reduced relative to the exposure time for second regions of the video frames that have slow motion or no motion present in the scene, and the capture rate is maintained at the base capture rate for all the regions of the video frames. Therefore the invention includes different methods of capture that are suited for different levels of local motion within the scene. The method of locally reduced exposure time at the base capture rate is suited to less rapid motion than the method of locally increased capture rate and the method of locally increased capture rate combined with locally reduced exposure time is suited for capturing video frames of scenes which contain regions with the fastest motion.

Figure 3:
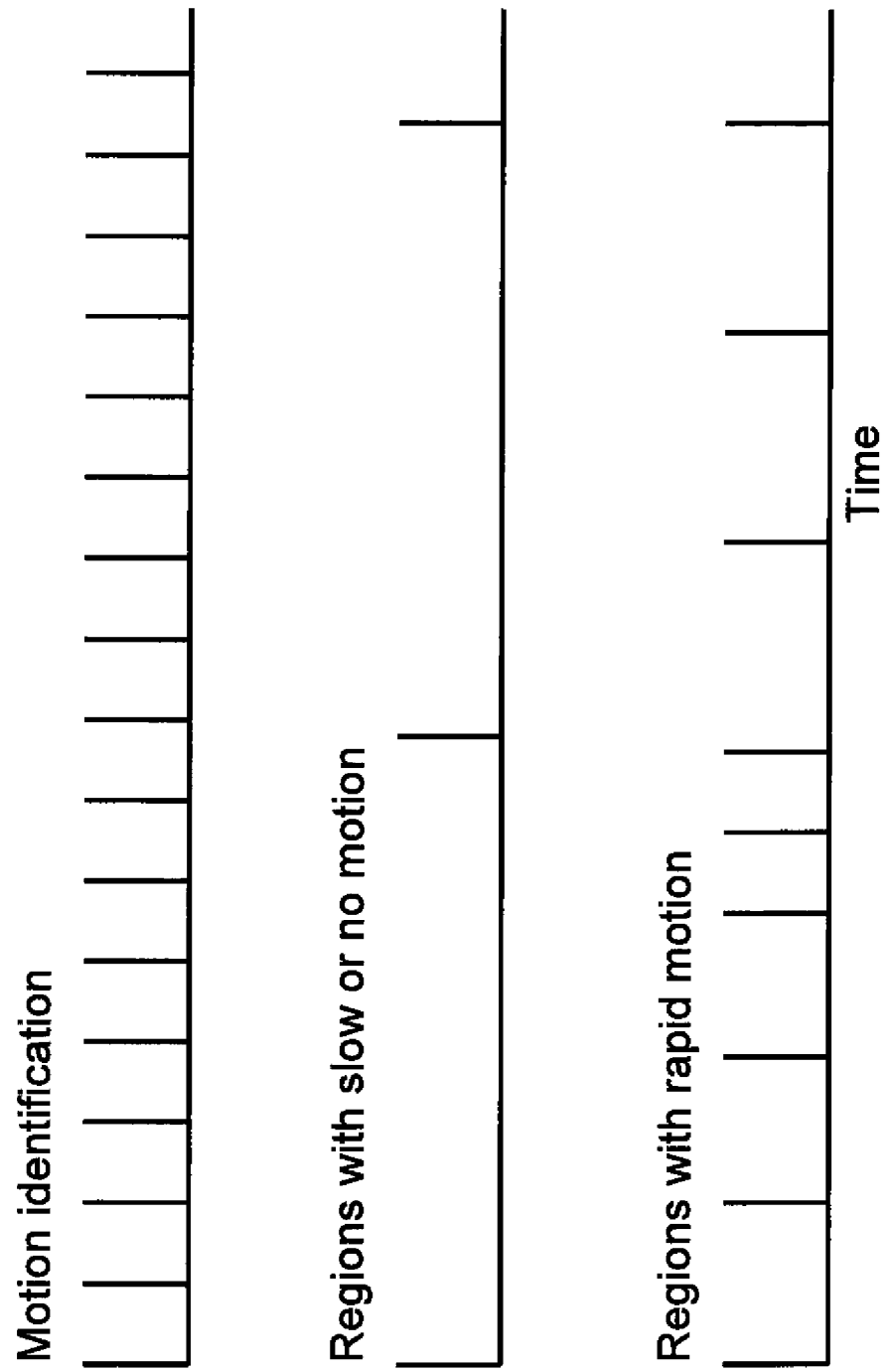
FIG. 3 shows a schematic diagram of the relative timing of the captures of the different types of images that are included in another embodiment of the invention.

FIG. 3 shows a schematic diagram of another example of the relative timing of the continuous capture of the different types of images that are included in the previously described embodiments of the invention. In this embodiment, motion identification images are captured at a very fast rate and capture rates for different regions of the image are changed in response to changes in the relative speed of motion in the scene. The timing of the image captures for the regions with rapid motion, as shown in FIG. 3, illustrates changes in the capture rate for these regions as the speed of motion increases and decreases.

It is desirable to capture motion identification images at a very fast capture rate as shown in FIG. 3 so that rapidly moving objects in the scene can be identified quickly and the local capture rate in that region can be increased or the local exposure time reduced as described by the invention, before motion blur of the rapidly moving object occurs in a video frame, or before the rapidly moving object leaves the scene. As a result, the characteristics of the motion identification images can be different from the images of the different regions of the video frames or the full video frames, to enable the motion identification images to be captured more quickly. Wherein, the full video frames include the captured different regions combined to form a full video image of the scene. The capture of the motion identification images and the capture of the first or second regions can take place simultaneously at different frame rates as previously mentioned for sensors such as CMOS sensors within a repeating sequence or as desired. As an example, the motion identification images can be lower resolution images that are binned to increase pixel sensitivity and thereby enable a reduced exposure time for reduced motion blur in the image. Binning involves an electrical connection between 2 or more neighboring pixels on the image sensor, thereby increasing the effective size of the binned pixel and reducing the effective resolution of the image sensor for faster readout. In addition, the motion identification images can be sparsely sampled, such as in preview images which are displayed on the image capture device, to further reduce the amount of data in the motion identification images to enable faster readout and faster image processing. Sparse sampling includes a readout, or use, of a portion of the available pixel data that is spread across the image sensor and not using other portions of the available pixel data. Typically sparse sampling is done by reading out or using pixels on a regular pattern, such as for example: readout every fourth pixel, or readout every other row of pixels. Sparse sampling can be done in conjunction with binning as well, for example: readout two binned rows and then skip two rows. Sparse sampling can also be accomplished by dedicated wiring within the image sensor. Many image sensors provide a decimated readout which is a form of sparse sampling for certain low resolution applications wherein rows of pixels are skipped and not used (or reset) during readout. Reducing the number of pixels in the motion identification images either by binning or sparse sampling enables a faster readout of the motion identification images and less data (fewer bits) needs to be processed by the image processor as well so the process of identifying motion can be done on a faster basis. In addition, some motion identification images can also be formed from other images of different regions by summing pixels together or eliminating pixels to form images with the same characteristics as the other motion identification images and thereby reduce the total number of images to be captured, particularly when the images of the first regions are captured at a fast capture rate. This embodiment can be used to form an improved image with reduced blur wherein the capture cycle of different regions occurs simultaneously at different capture rates.

To further enable fast capture of motion identification images, the invention includes the use of motion identification images substantially having panchromatic pixels when using an image sensor which includes color pixels (such as red, green and blue or cyan, magenta and yellow) and panchromatic pixels. The panchromatic pixels are more efficient than the color pixels at collecting light from a scene since they collect light from substantially the entire visible light spectrum and the color pixels collect light from only a portion of the visible light spectrum. Typically each color pixel collects light from ⅓ of the visible light spectrum so that the panchromatic pixels collect light from a 3× wider spectrum than each of the color pixels and as a result, the panchromatic pixels are approximately 3× more sensitive to light from the scene. In this embodiment, the panchromatic pixels with their higher sensitivity are used to capture motion identification images at a fast capture rate with less noise to enable a faster and more accurate measure of motion than would be possible with the color pixels. In this embodiment, portions of the panchromatic pixels can be readout separately for the motion identification images. Further, the panchromatic pixels can be captured along with the color pixels in images of the different regions of the video frames to provide full video frames with a higher signal to noise ratio.

To enable faster measurement of motion and to reduce the lag time between motion identification and the start of increased local capture rate capture, a dedicated motion sensor such as the fast motion sensor that is set forth in above-cited, commonly-assigned co-pending U.S. Ser. No. 12/262,227 can be used to provide motion identification images. The fast motion sensor of the reference uses an image sensor wherein the captured motion identification images are converted to a one bit edge maps on the image sensor chip to drastically reduce the amount of data (the number of bits) associated with the motion identification images to be readout and processed. By reducing the amount of data associated with the motion identification images, very rapid comparisons of consecutive motion identification images can be accomplished for the purpose of identifying where motion is located in the scene and how fast the motion is. In one embodiment of the present invention, a dedicated motion sensor 550 is provided as shown in FIG. 5. The dedicated motion sensor 550 is capable of operating at a much faster capture rate than the image sensor 520, and the speed of motion within regions of the scene can therefore be quickly identified as in Step 105 or Step 400 and a series of motion vectors or motion maps can be produced. The motion vectors or motion maps are then used by the image processor to assign capture rates for different regions of the video frames as in Step 115 or Step 410.

In general, increasing the capture rate of regions of the image results in an overall increase in the bit rate or bandwidth required to transmit or display the video image data. Increasing the bit rate or bandwidth is acceptable in some applications, but in many applications the available bit rate or bandwidth is limited. Consequently, in an additional embodiment of the invention, increases in the capture rate of first regions of the video frame are accompanied by decreases in the capture rate of second regions of the video frame. As rapid motion is identified in first regions of the video frames and the assigned capture rate is increased for the rapid motion regions, second regions of the video frames are identified which have slow or no motion present and the capture rate is decreased for the regions with slow or no motion. This balancing of increased capture rate for some regions and decreased capture rate for other regions enables the motion blur in the regions with rapid motion to be reduced in the full video frames and the bit rate or bandwidth needed to transmit or store the full video frames to be substantially maintained or reduced. The balancing of the changes in capture rate can be done based on the relative areas of the different regions. For example, if a small area of rapid motion in the video frame requires a large increase in capture rate to reduce the motion blur to below 2 or 4 pixels, this increase in capture rate is balanced by a small decrease in capture rate for a much larger area of the video frame (or even the entire remainder of the video frame) where there is slow or no motion present.

Figure 4:
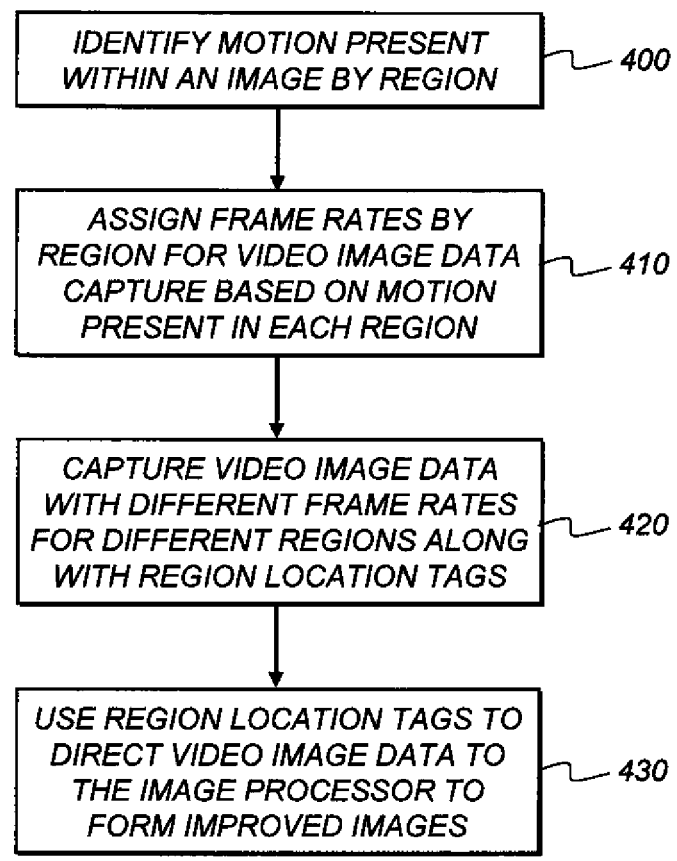
FIG. 4 shows a flow diagram for a method using region location tags with the video image data of the different regions to the image processor to form improved images according to yet another embodiment of the invention.

The present invention uses images that are captured simultaneously at different capture rates from different regions of the same image sensor, since the images of the different regions all come from the same image sensor, the difficulty of stitching the images of the different regions back together to form a full video frame for display can be reduced. Consequently, FIG. 4 shows a flow diagram for yet another embodiment of the invention, which provides an improved method for manipulating the video images of the different regions to form full video frames for display. In this embodiment, the user again initiates capture by pushing the capture button, and Steps 400 and 410 are the same as Steps 105 and 115 in FIG. 1. However, in Step 420, the images of the different regions, which are captured at different capture rates, are captured along with region location tags that identify the locations of the regions on the image sensor that the images of the different regions were captured from. The region location tag information is captured and stored or transmitted along with the data of the images of the different regions to the display. In Step 430, the region location tags are used to direct the data of the images of the different regions to the appropriate different regions of the display for combining to form the full video frames for display. By providing region location tags, the image processor can be used to merge the images of the first regions with high capture rate together with the images of the second regions with slower capture rate to form improved full video frames for display wherein the regions of the full video frames with rapid motion have reduced blur. The region location tags permit the fast capture rate image data to be efficiently processed by the image processor with a reduced need to correlate all the images of the different regions to one another to align the images of the different regions within the improved full video frames. The region location tags can be generated in the same step as the motion identification or they can be generated for the images of the different regions as part of the readout process as the region is readout from the image sensor.

The region location tags can also be used to identify the boundaries between the different regions so that tone scale adjustments can be performed across the boundaries to improve the tone scale uniformity between the different regional images when forming the full video frames for display. Tone scale adjustment can be important when exposure times for different regions in the full video frame are substantially different. A comparison of pixel values can be done across the region boundaries and the tone scaling adjusted to match the average values across the region boundaries as is well known in the art.

Other image processing operations can also be assisted by the region location tags. For instance, because the exposure times for the different regions can be substantially different due to capture rate limitations on exposure time, or due to reduced exposure times within the available time between captures, the noise level (perceived as randomly bright and dark pixels) and the associated signal to noise ratio in the different regions can also be substantially different. First regions that are captured with shorter exposure times will generally have a higher noise level while second regions that are captured with a longer exposure time will have a lower noise level. Therefore, image enhancement techniques including more aggressive noise cleaning operations, filtering or smoothing can be applied to the first regions to reduce the noise in the first regions, or alternately noise can be added to the second regions to increase the noise in the second regions. A similar noise level is particularly important near region boundaries to conceal these boundaries.

In yet another embodiment, motion assessment as set forth e.g. in the cited '640 patent can be employed. This method performs regression clustering (also called clusterwise linear regression), an iterative method of selecting a plurality of regression functions, assigning each data point to the function which yields the lowest regression error, running each regression, and repeating until no data points change membership in the assignment step. Each regression function corresponds to a single object or other group of pixels moving together. The regression functions create curves in a four-dimensional space defined by coordinates (frame number, x, y, color index). The (x, y) coordinates of each regression curve as frame number increases then provide the locations of the objects in motion. According to this embodiment of the present invention, the motion assessment information is used to assign capture rates and associated capture settings, such as exposure time and gain, for each region within each image to adjust the local capture conditions based on the motion present. For example, the exposure time can be proportional to the Cartesian distance between the (x, y) coordinates for a selected frame and the (x, y) coordinates for the following frame. Fast-moving objects will therefore have shorter exposure times and so will be captured with reduced blur. Information about the timing of the capture such as the time of capture or the capture rate for each region of the image is included along with the video image data and the region location tags.

In a further embodiment of the invention, a capture rate map is generated along with the video image data and stored for use in improving the image quality of the video image as displayed.

In a yet further embodiment of the invention, a series of motion vectors or a motion map determined from the motion assessment step and is stored with the video image data.

In a still further embodiment of the invention, a capture rate indicator that records the capture rate or an exposure time indicator that records the exposure time is stored with the video image data. This capture rate indicator data or exposure time indicator data can be stored with respect to each pixel of video image data to be stored or, alternately location tags can be stored with a capture rate indicator or exposure time indicator for each captured region in the video image and defined by the location tags. The rate indicator or exposure time indicator is useful for establishing the duty cycle for the regions of a display or displaying the video. The capture rate indicators, the exposure time indicators or any motion related information such as motion vectors or a motion map, can be stored in one or more of the least-significant bits in the image data for each video frame or each pixel.

In another embodiment of the invention, the capture rate indicators, the exposure time indicators or any motion related information can be stored in the form of spatially dispersed data within the video image data as described in commonly-assigned U.S. Pat. No. 6,044,182 to Daly et al. As set forth in this reference, a spatially-dispersed data image can be embedded in a given source image invisibly to a viewer by selecting a binary message representing given digital data, forming the message into a 2-D data image e.g. by using a raster pattern to convert the binary message to a data image, convolving the data image with a carrier image to form a frequency-dispersed data image (FDDI), and adding the FDDI to the source image. The carrier image can be a linear or log chirp rotated around a centerpoint. Multiple copies of the FDDI can be tiled and added to the source image to improve redundancy. According to this embodiment of the present invention, the source image can be the image data for a first region or a second region of the video of the scene. The binary message can include the capture rate indicators, the exposure time indicators, or any motion related information. For example, the exposure time can be expressed in milliseconds, and that number of milliseconds expressed as a sixteen-bit binary number to form the binary message. This permits expressing exposure times up to one minute (60,000 ms$<=2^{16}-1$ ms). The sixteen bits can be formed into a 4×4 data image e.g. by rasterizing MSB to LSB, left-to-right, top-to-bottom. As described by Daly et al., the binary message can include an identification code that does not occur in the digital data, and error-correction coding can be used. According to the present invention, a 4b5b code as known in the art can be employed to convert the digital data into the binary message, and a 4b5b value not corresponding to a valid four-bit data string can be used as the identification code.

The invention has been described in detail with particular reference to certain preferred embodiments thereof, but it will be understood that variations and modifications can be effected within the spirit and scope of the invention.

PARTS LIST 100 video frame
105 Step
110 Region with slow or no motion
115 Step
120 Region with rapid motion
125 Step
135 Step
400 Step
410 Step
420 Step
430 Step
510 Lens assembly
520 Image sensor
530 Image processor
540 Data storage
550 Optional motion sensor
560 User interface

The invention claimed is:

1. A method of capturing a video of a scene depending on a speed of motion in the scene using an image capture device having a plurality of image capture pixels, comprising:

using the image capture device to capture a first and a second motion identification image of a video of the scene, wherein the second motion identification image is captured subsequent to the first motion identification image;

performing a region-determining function on a processor of the image capture device that determines, after the capturing of the second motion identification image, those image capture pixels that constitute a first image region and a second image region, the first image region identified as having a higher speed of motion in the scene than the second image region, the first image region identification based on a comparison of the first and second motion identification images, the comparison being performed automatically by the processor of the image capture device;

performing a speed-determining function to determine a relative speed of motion in the first image region with respect to motion in the second image region, wherein both the first image region and the second image region contain motion within the scene; and capturing a frame of the video of the scene where a capture rate of the image capture pixels of the first image region is caused to be greater than the capture rate of the image capture pixels of the second image region based on the determined relative speed of motion, or an exposure time of the first image region is caused to be less than an exposure time of the second image region based on the determined relative speed of motion.

2. The method of claim 1, wherein causing the capture rate of the first image region to be greater than the second image region is performed when the relative speed of motion is above a predetermined relative speed.

3. The method of claim 2, wherein the predetermined relative speed would cause greater than two pixels of motion blur per video frame in the first image region when applying the capture rate of the second image region.

4. The method of claim 2, wherein image enhancement is performed on the first image region to reduce noise when motion in the first image region is above the predetermined relative speed.

5. The method of claim 1, further including providing a location tag for the first image region that identifies a location of the first image region within the frame.

6. The method of claim 1, wherein the capture rate of the image capture pixels of the second image region is reduced as the capture rate of the image capture pixels of the first region is increased.

7. The method of claim 1, further including storing the image capture pixels of the first image region and the second image region and an associated capture rate indicator, exposure time indicator, motion map, or motion vectors.

8. The method of claim 1, further including capturing a next frame of the video of the scene.

9. The method of claim 8, further including providing location tags for a plurality of captured frames, the location tags identifying locations for each first image region within corresponding frames.

10. The method of claim 1, wherein the capture rate of the image capture pixels of the second image region is reduced as the capture rate of the image capture pixels of the first region is reduced.

11. An image capture device comprising:
a lens for directing incoming light along an optical path;
an image sensor for sensing the incoming light; and
an image processor communicatively coupled to the image sensor,
wherein the image processor is configured to:
capture a first and a second motion identification image of a video of a scene, wherein the second motion identification image is captured subsequent to the first motion identification image;

determine, after the capturing of the second motion identification image, first image capture pixels for a first image region and second image capture pixels for a second image region, the first image region identified as having a higher speed of motion in the scene than the second image region, the first image region identification based on a comparison of the first and second motion identification images;

determine a relative speed of motion in the first image region with respect to motion in the second image region, wherein both the first image region and the second image region contain motion within the scene; and capture a frame of the video of the scene, wherein a capture rate of the image capture pixels of the first image region is caused to be greater than the capture rate of the image capture pixels of the second image region based on the determined relative speed of motion, or an exposure time of the first image region is caused to be less than an exposure time of the second image region based on the determined relative speed of motion.

12. The image capture device of claim 11, wherein causing the capture rate of the first image region to be greater than the second image region is performed when the relative speed of motion is above a predetermined relative speed.

13. The image capture device of claim 12, wherein the predetermined relative speed would cause greater than two pixels of motion blur per video frame in the first image region when applying the capture rate of the second image region.

14. The image capture device of claim 12, wherein image enhancement is performed on the first image region to reduce noise when motion in the first image region is above the predetermined relative speed.

15. The image capture device of claim 11, wherein the one or more image processors are further configured to include a location tag for the first image region that identifies a location of the first image region within the frame.

16. The image capture device of claim 11, wherein the capture rate of the image capture pixels of the second image region is reduced as the capture rate of the image capture pixels of the first region is increased.

17. The image capture device of claim 11, wherein the one or more image processors are further configured to store the image capture pixels of the first image region, the image capture pixels of the second image region, and an associated one or more of a capture rate indicator, an exposure time indicator, a motion map, or motion vectors.

18. The image capture device of claim 11, wherein the one or more image processors are further configured to capture a next frame of the video of the scene.

19. The image capture device of claim 18, wherein the one or more image processors are further configured to provide location tags for a plurality of captured frames, the location tags identifying locations for each first image region within corresponding frames.

20. The image capture device of claim 11, wherein the capture rate of the image capture pixels of the second image region is reduced as the capture rate of the image capture pixels of the first region is reduced.

* * * * *